United States Patent

[11] 3,631,735

| [72] | Inventor | William V. McCarty Cincinnati, Ohio |
| [21] | Appl. No. | 51,797 |
| [22] | Filed | July 2, 1970 |
| [45] | Patented | Jan. 4, 1972 |
| [73] | Assignee | General Electric Company |

[54] GAS TURBINE ENGINE GEARBOXES
3 Claims, 3 Drawing Figs.

[52] U.S. Cl. .................................................. 74/405, 74/606, 287/53 SS
[51] Int. Cl. ............................................... F16h 57/00, F16h 57/02, F16c 3/10
[50] Field of Search ........................................... 287/53 SS, 58 CT; 74/405, 606; 64/1

[56] References Cited
UNITED STATES PATENTS
3,393,533  7/1968  Wilkinson .................. 287/53 SS

*Primary Examiner*—Leonard H. Gerin
*Attorneys*—Derek P. Lawrence, E. S. Lee, III, Lee H. Sachs, Frank L. Neuhauser, Oscar B. Waddell and Joseph B. Forman ABSTRACT: A first gearbox is mounted on the casing of a gas turbine engine and driven by a radial shaft from the engine's rotor. An axial shaft connection from the first gearbox drives a second gearbox. This shaft connection can be broken and telescoped to permit independent removal of either gearbox in a radial direction.

PATENTED JAN 4 1972
3,631,735
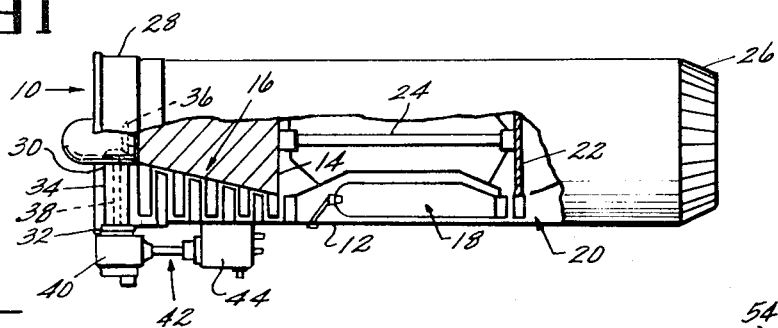
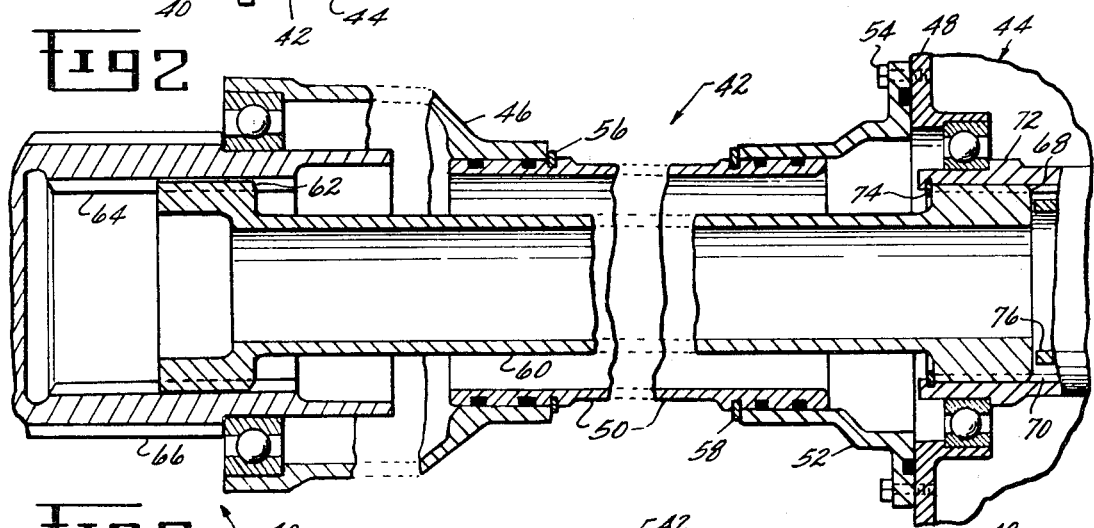
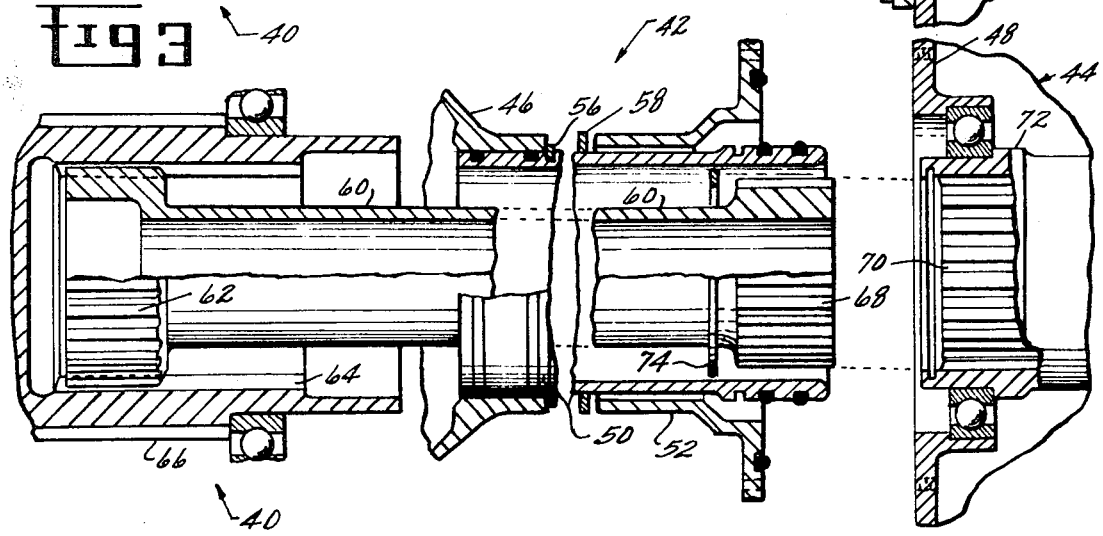
INVENTOR.
WILLIAM V. McCARTY
ATTORNEY

GAS TURBINE ENGINE GEARBOXES

The invention described and claimed in the U.S. patent application herein resulted from work done under United States Government contract FA-SS-66-6. The United States Government has an irrevocable, nonexclusive license under said application to practice and have practiced the invention claimed herein, including the unlimited right to sublicense others to practice and have practiced the claimed invention for any purpose whatsoever.

The present invention relates to gas turbine engines and more particularly to improved gearboxes employed to derive auxiliary shaft power from such engines.

Gas turbine engines basically comprise a compressor for pressurizing an airstream, a combustor for burning fuel in the pressurized air to generate a high energy level, hot gas stream and a turbine which is driven by this hot gas stream to drive the compressor. The remainder of the energy of the hot gas stream may be converted to a useful output by being discharged from a propulsive nozzle; by driving a turbine powering an output shaft or by a combination of both as in a turbofan engine. In any case, there is a need to derive from the rotating components, shaft power which may be required for several different purposes, as for example, driving such engine components as the main fuel pump and other like components which are generally referred to as accessories.

Such shaft power, in gas turbine engines, must be derived from a rotor element located centrally of, or on the axis of, the engine. Many workable schemes have been proposed for this purpose. Generally, a bevel gear connection transmits power to a radial shaft from the central axis of the engine's rotor. Because of other engine mounting problems, this radial shaft power must then be transmitted through a gear connection, referenced as a transfer gearbox in an axial direction, to a gearbox which drives accessories such as the main fuel pump.

In conventional systems, a serious problem arises when either the transfer gearbox or the accessory gearbox must be removed for repair or maintenance. In order to remove either of these gearboxes it is necessary to remove both. This is due to the conventional manner of providing a spline or the like connected shaft which extends axially between the two gearboxes and the further restriction that the gearboxes must be removed in a radial direction either because of the radial drive connection to the transfer gearbox or the many liquid and electrical connections to the accessory gearboxes.

Accordingly, the object of the invention is to provide, in an improved fashion, singular removal of such gearboxes as desired.

These ends are broadly obtained by providing an axial shaft connection between a transfer gearbox and an accessory gearbox, or the like, which may be telescoped into one of the gearboxes to provide a clearance which allows either gearbox to be removed independently in a radial direction.

Further aspects of the invention are found in the details of accomplishing the above and also providing a sealed connection between the two gearboxes which encloses the shaft connection.

The above and other related objects and features of the invention will be apparent from a reading of the following description of the disclosure found in the accompanying drawings and the novelty thereof pointed out in the appended claims.

In the drawings:

FIG. 1 is a schematic showing of a gas turbine engine embodying the present invention;

FIG. 2 is a longitudinal section with portions broken away of the shaft connection between two gearboxes seen in FIG. 1; and FIG. 3 is a section similar to FIG. 2 illustrating how this shaft connection is disconnected for individual removal of the gearboxes.

FIG. 1 illustrates the basic components of a gas turbine engine as previously referenced. Air enters the engine inlet 10 and is pressurized along an annular flowpath defined by the engine casing 12 and the rotor 14 of a compressor 16. This pressurized air supports combustion of fuel in a combustor 18 to generate a high energy hot gas stream. This gas stream drives a turbine 20, which includes a rotor 22 that is coupled to the compressor rotor 14 by a shaft 24. In the illustrated engine, the remainder of the available energy of the hot gas stream is converted to a propulsive force by being discharged from a nozzle 26.

The engine further comprises a front frame 28 secured to the upstream end of the casing 12. This frame includes an inner housing 30 which is connected to an outer hoop 32 by a plurality of struts 34. A gearbox including bevel gears 36 transmits shaft power from the rotor 14 to a shaft 38 which extends radially through one of the struts 34. The shaft 38 is spline connected to the input gear of a gearbox 40 which is bolted to the front frame outer hoop 32—in effect the engine casing 12. The net result of this mounting arrangement is that the transfer gearbox must be removed in a radial direction.

From the transfer gearbox, shaft power is taken in an axial direction by an axial shaft connection 42 to an accessory gearbox 44. The gearboxes 40 and 44 comprise housings 46, 48, respectively, which are bolted to the casing 12.

The axial shaft connection 42 is illustrated in detail in FIGS. 2 and 3. One end of a tube 50 is sealingly received in an opening in the transfer gearbox housing 46. The opposite end of the tube 50 is sealingly received in a removable cap 52 which is secured to the accessory gearbox housing 48 by screws 54. The tube 50 is held in this assembled relation by removable snaprings 56, 58. The tube 50 thus provides a closed system between the gearboxes.

Within the tube 50 is a shaft 60 having splines 62 at one end which are received by a splined bore in the output gear 66 of the transfer gearbox 40. The other end of the shaft 60 has a spline 68 which is received by a splined bore 70 formed in the input gear 72 of the accessory gearbox 44. The shaft 60 is held in this assembled relation by a snapring 74 removably inserted in the bore of the input gear 72 and capturing the spline 68 between itself and lugs 76 within the bore 70.

The described shaft connection transfers shaft power in an axial direction (relative to the engine), from the transfer gearbox to the accessory gearbox. Additionally, this connection provides a seated system as referenced above.

Further, the described connection may readily be broken to permit independent removal of either of the two gearboxes. This is done by removing the capscrews 54 and the snapring 58. The cap 52 may now be telescoped back onto the tube 50 to the position illustrated in FIG. 3. Access is now had to the snapring 74 for its removal by a standard tool. The snapring 74 is pushed onto the shaft 60 as the shaft is telescoped further into the splined bore 64, the depth of the latter being sufficient for the spline 68 to be clear of the gear 72 and the accessory gearbox housing 48 as illustrated in FIG. 3. Now either gearbox may be removed without removing the other.

The shaft connection may readily be reassembled by reversing the steps described above.

It will be apparent that variations in the preferred embodiment described will occur to those skilled in the art, within the spirit and scope of the present inventive concepts which are therefore to be derived solely from the following claims.

Having thus described the invention, what is claimed as novel and desired to be secured by Letters Patent of the United States is:

1. In a gas turbine engine having:
   a casing,
   an engine rotor,
   a shaft extending radially from said rotor and driven thereby,
   a first gearbox mounted on the casing and driven by said shaft,
   a second gearbox mounted on said casing,
   said first and second gearboxes respectively having output and input gears which are axially aligned;
   a shaft connection between said gears characterized by
   a shaft having splines at its opposite ends, splined bores in said gears for receiving said splines,
removable means for locking the shaft in an axial position wherein both splines are received by said bores, and
axial clearance in the bore direction of one of said gears permitting the shaft to be withdrawn from the bore of the other gear and clear of the gearbox upon removal of the shaft locking means,
thereby enabling independent removal of either gearbox.

2. A combination as in claim 1 wherein the shaft assembly further includes
a tube connected at its opposite ends to said gearboxes and surrounding said shaft, and
telescoping means mounting said tube and providing access to said removable shaft locking means.

3. A combination as in claim 2 wherein
the telescoping means includes a cap removably secured to one of said gearboxes and slidable onto said tube upon removal from said one gearbox,
said tube being axially spaced from said one gearbox and the gear therein connected to said shaft,
the removable shaft locking means comprise a snapring in the bore of the gear of said one gearbox which prevents withdrawal of the spline from the bore of that gear,
said snapring being accessible for removal when said cap is removed from said one gearbox and slid onto said tube.

* * * * *